United States Patent
Hritz et al.

(10) Patent No.: US 10,036,381 B2
(45) Date of Patent: Jul. 31, 2018

(54) COMPRESSOR PISTON SHAPE TO REDUCE CLEARANCE VOLUME

(71) Applicant: Westinghouse Air Brake Technologies Corporation, Wilmerding, PA (US)

(72) Inventors: Jeffrey Hritz, Jefferson Hills, PA (US); Matthew D. Mitsch, Harrison City, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 273 days.

(21) Appl. No.: 14/852,967

(22) Filed: Sep. 14, 2015

(65) Prior Publication Data

US 2017/0074259 A1    Mar. 16, 2017

(51) Int. Cl.

| F04B 39/00 | (2006.01) |
|---|---|
| F04B 53/00 | (2006.01) |
| F04B 25/00 | (2006.01) |
| F04B 39/12 | (2006.01) |
| B61H 13/00 | (2006.01) |
| F04B 39/10 | (2006.01) |
| F04B 53/14 | (2006.01) |
| F16D 125/06 | (2012.01) |
| F16D 125/08 | (2012.01) |

(52) U.S. Cl.
CPC ........... *F04B 53/008* (2013.01); *B61H 13/00* (2013.01); *F04B 25/00* (2013.01); *F04B 39/0005* (2013.01); *F04B 39/0094* (2013.01); *F04B 39/10* (2013.01); *F04B 39/122* (2013.01); *F04B 39/125* (2013.01); *F04B 53/14* (2013.01); *F16D 2125/06* (2013.01); *F16D 2125/08* (2013.01)

(58) Field of Classification Search
CPC .. F02D 15/04; F04B 11/0091; F04B 39/0094; F04B 39/121
See application file for complete search history.

(56) References Cited

U.S. PATENT DOCUMENTS

| 4,955,328 | A | 9/1990 | Sobotowski |
|---|---|---|---|
| 6,129,070 | A | 10/2000 | Jingu et al. |
| 6,447,267 | B1 | 9/2002 | Varney et al. |
| 8,128,379 | B2 | 3/2012 | Hritz |
| 2001/0018904 | A1 | 9/2001 | Suzuki et al. |
| 2012/0192710 | A1 | 8/2012 | Moore et al. |
| 2015/0226193 | A1 | 8/2015 | Flanigan |

FOREIGN PATENT DOCUMENTS

WO    2014039153 A1    3/2014

*Primary Examiner* — Patrick Hamo
(74) *Attorney, Agent, or Firm* — The Webb Law Firm

(57) ABSTRACT

A piston assembly for reducing clearance volume in a reciprocating compressor for compensating for piston tilt and improving the volumetric efficiency of the compressor includes a piston located within a piston cylinder, the piston having a first end and a second end, a wrist pin associated with the first end of the piston, and a cylinder head/valve assembly associated with the second end of the piston, wherein at least a portion of the second end of the piston includes an angled portion. The piston having the angled portion can be used with oil free cylinders and trunk type pistons. The piston can also be used in a multiple stage, multiple cylinder compressor including a series of piston assemblies. A method of increasing the volumetric efficiency of a reciprocating compressor can also be achieved using the piston having an angled portion.

17 Claims, 7 Drawing Sheets

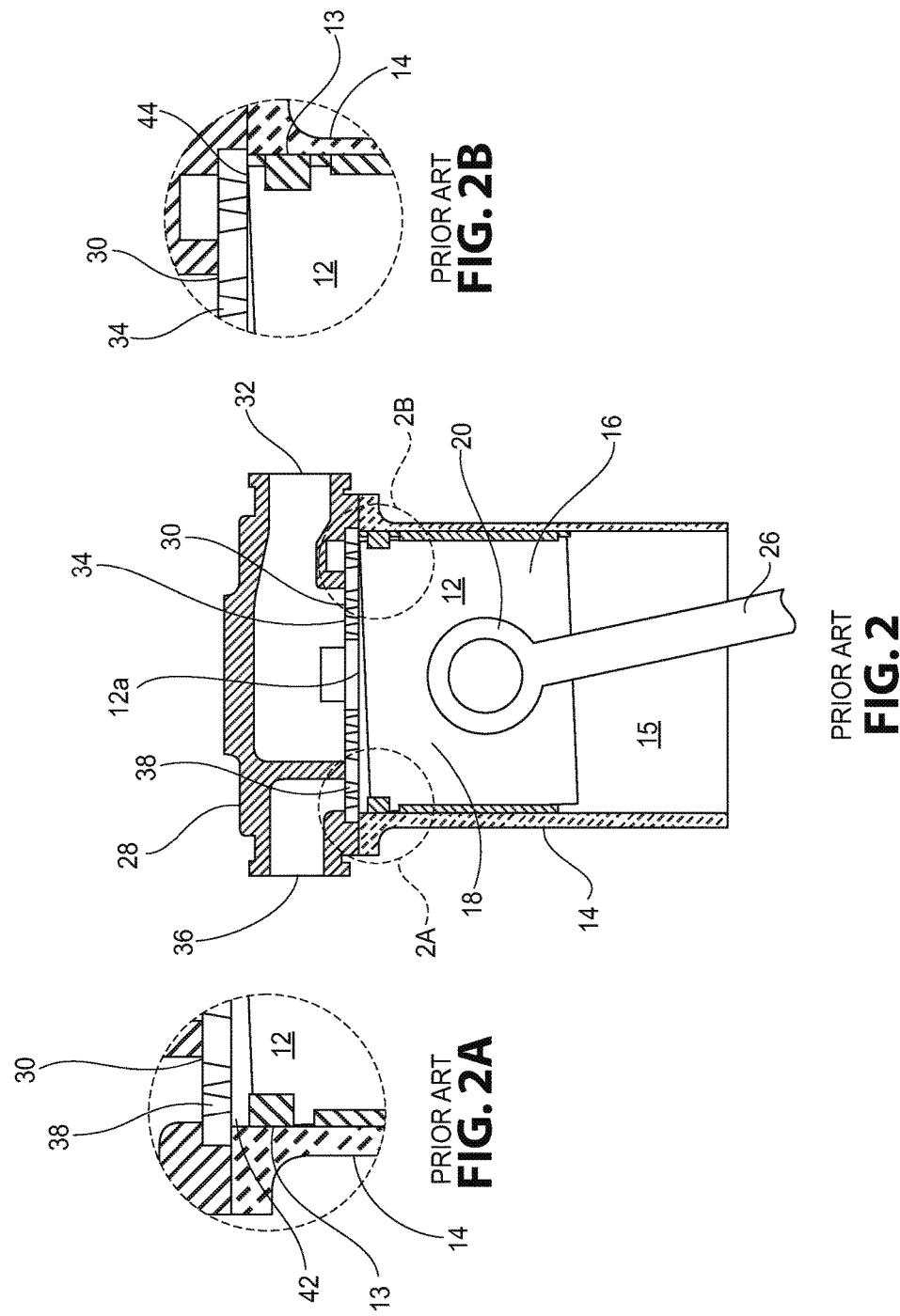

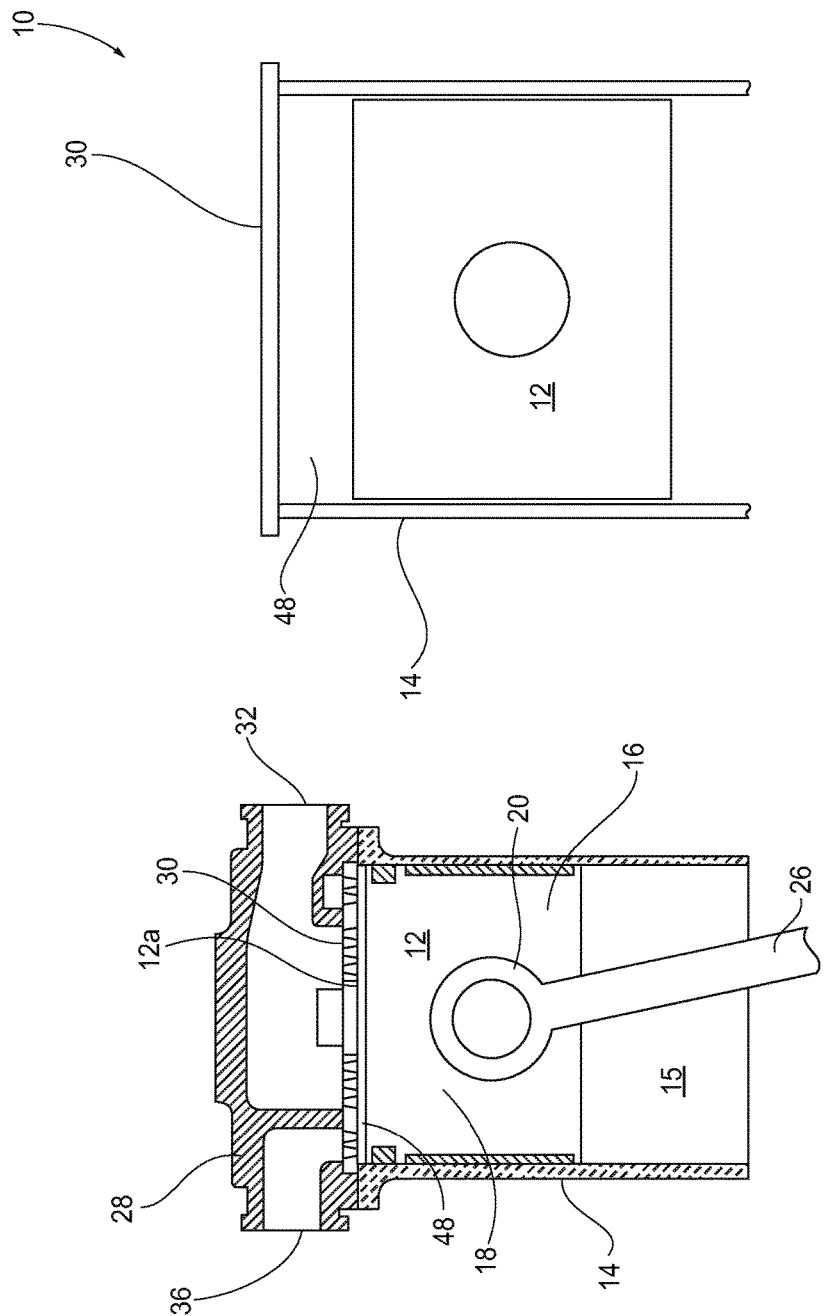

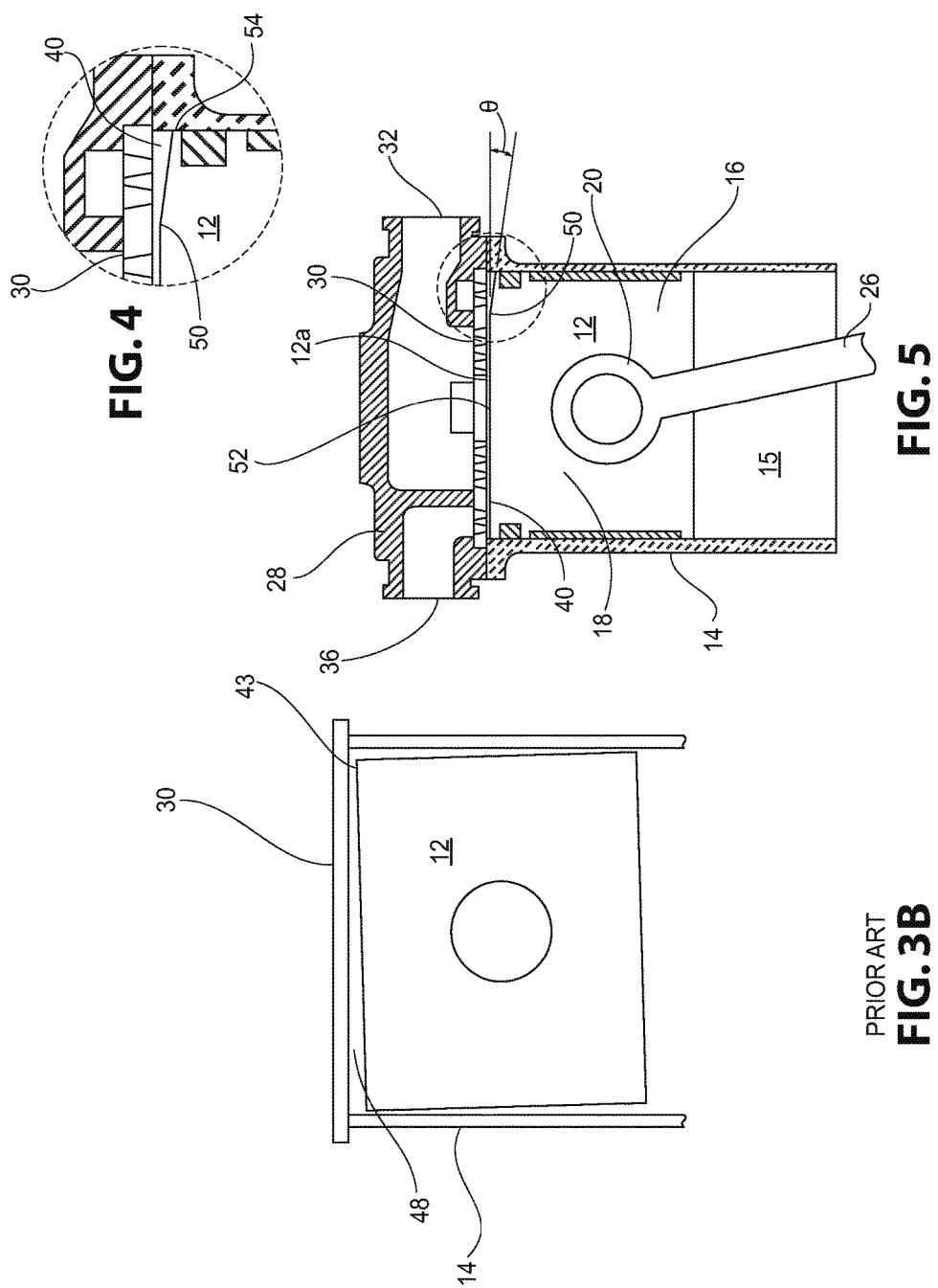

COMPRESSOR PISTON SHAPE TO REDUCE CLEARANCE VOLUME

BACKGROUND OF THE INVENTION

Field of the Invention

The present disclosure relates to a piston for use in a reciprocating compressor such as a reciprocating compressor adapted for use on rail vehicles for the purpose of supplying compressed air to pneumatic units associated with the rail vehicle, and, more particularly, to a piston configured for maximizing the volumetric efficiency of the compressor.

Description of Related Art

Normally, a pneumatic system is provided for a rail vehicle by which the brakes of the rail vehicle are operated. An air compressor is used to supply compressed air to one or more pneumatic units associated with the rail vehicle involved in the operation of the brakes. The air compressor usually consists of a driving unit, such as an electric motor, and of a compressor unit, which typically consists of several piston-cylinder arrangements that are driven by a crankshaft. The crankshaft is driven by the driving unit and includes connecting rods to convert the rotating movement of the driving unit into linear movement for each piston to supply compressed air to the downstream units. Furthermore, air compressor units for use on rail vehicles may have a single-stage or a multi-stage construction, with at least one low-pressure stage and one high-pressure stage.

A reciprocating compressor is the simplest example of the positive displacement class of compressors. This type of compressor was also the earliest designed. Like reciprocating incompressible fluid pumps, reciprocating compressors can also be either single acting or double acting. Single-acting compressors are usually of the trunk type. Double-acting compressors are usually of the crosshead type.

Reciprocating compressors are available in both lubricated and non-lubricated versions. The lubricated versions provide lubrication for the moving pistons (in the cylinder), most often via an oil pump and injection of oil to the cylinder bore. There are some applications where oil must be completely omitted from the compressed air or gas exiting the machine. For such applications where a reciprocating piston type of compressor is required, there are non-liquid lubricated compressors. Recently, dry-running air compressors have found increased usage in the rail vehicle field. A dry-running air compressor operates without lubricating oil situated in the housing and is said to be "oil-free". These compressors have piston rings around the periphery of each piston for dynamic sealing to allow compression. These piston rings are made of special wear-resistant dry lubricating materials such as polytetrafluorethylene. They also utilize tight tolerances and special coating or rings of similar material composition as the piston rings to guide the piston within the cylinder bore. Trunk type non-lubricated compressors have dry crankcases with permanently lubricated bearings. Crosshead type compressors usually have lengthened piston rods to ensure that no oil wet parts enter the compression space.

The volumetric efficiency of a reciprocating compressor is defined by the ratio of the actual amount of air flow discharged from a compressor (actual air delivery volume) to the total amount of air that can theoretically flow into the compressor inlet during the intake stroke (swept volume). The swept volume is defined by the speed of the compressor, the diameter of the cylinders, and the distance traveled by the cylinders in each rotation (the compressor stroke). The actual amount of compressed air delivered from the compressor is effected by several losses including leakage and piston ring blow by, however a major factor is the amount of volume between the top of the piston (the crown) and the cylinder valves when the piston is at the top of its stoke or top dead center.

This volume is called the clearance volume. The clearance volume defines the amount of air that is pulled into the cylinder on the intake stroke, compressed during the compression stroke, but is not discharged from the cylinder before the next intake stroke. Instead, while fresh atmospheric air enters the cylinder during the intake stroke, the compressed air left behind in the clearance volume re-expands filling the cylinder volume that otherwise would have been filled with atmospheric air being pulled into the cylinder. The end result of the re-expansion is that the cylinder is not capable of delivering, during the discharge stroke, the same amount of air that can be theoretically ingested into the cylinder during the intake stroke.

This same phenomenon occurs within each stage of a multiple stage compressor. The difference is that the inlet air is at a higher pressure than ambient if the cylinder is part of the second, third, or subsequent stage of a compressor. The clearance volumes in each cylinder and stage are additive and result in a reduction in overall compressor efficiency. The role that the clearance volume plays in determining the overall efficiency of an air compressor makes it a critical characteristic of compressor design. Simply stated, a compressor with less clearance volume is more efficient than a compressor with more clearance volume.

In an oil free compressor, it is common practice to utilize piston rings made from composite materials that have self-lubricating properties. A common problem with composite rings is that they have coefficients of expansion that are greater than typical metals. The expansion factor of the rings may be as much as 10-15 times greater than the typical materials used for the piston and cylinder. As a result, the clearances between the piston rings and cylinder wall must be greater than in a compressor with a lubricated cylinder where the piston rings and cylinder liners are made of similar materials. The clearances must account for cylinder temperatures that may be five times greater than ambient conditions and not result in a complete reduction of piston to piston ring to cylinder liner radial clearance. A lack of clearance between the piston, piston rings, and cylinder liner will result in excessive heat generation in the cylinder and eventual piston seizure, causing a compressor failure.

At the same time, excessive clearance between the piston, piston rings, and cylinder liner can result in a piston that slaps in the cylinder bore, especially during the periods of the stroke when the piston is changing directions. This slap results in excessive compressor vibration, piston ring and cylinder liner wear, and premature compressor failure.

As a compressor with an oil free cylinder must have greater piston to cylinder liner clearance, there is a natural tendency for oil free compressors to have greater piston tilt around the wrist pin within a cylinder. In other words, the angle between the top of the piston and cylinder liner is not held at a near perfect 90 degrees for the entire length of the stroke. This is specific to compressor cylinders with trunk type pistons. Pistons of a compressor with a cross head are always held square to the cylinder bore and do not experience the same tilt with the bore. This type of design is more common and is typically for very large reciprocating compressors typically found in stationary industrial type use.

The increased tilt of the piston at the top of the stroke described above must be accounted for when determining the amount of clearance volume in the cylinder. In other words, the clearance volume must be greater to account for the piston tilting when moving from one side of the bore to the other when the piston changes direction at the top of its stroke. This angle means that the distance between the piston crown and cylinder head/valve on one side of the piston is greater than the distance between the piston crown and the cylinder head/valve on the other side of the piston. To avoid contact between the piston and the cylinder head/valve at the top of the stroke, the clearance volume must be increased to account for the piston angle created by the large clearance between the piston and cylinder liner.

The degree of angle of the piston at the top of the stroke is proportional to the size of the piston and the clearance between the piston and cylinder liner. Therefore, during compression start up and operation in cold temperature environments, the piston angle will be greater due to the greater clearance. The greater cold clearance is due to the need to account for the different rates of material expansion and the requirement that a minimum clearance is required across the entire thermal operational range of the compressor. The issue is also compounded by compressors that have an unloading feature. During unloaded operation, the compressor pistons are reciprocating within the cylinders without compressing air. Compressed air acts to push the piston away from the compressor head/valve and hold the piston crown perpendicular in the cylinder liner during the piston stroke. This helps to reduce the amount of piston tilt at the top of the stroke as well as to hold the internal clearances of the parts within the connecting rods and piston assembly to a minimum resulting in the maximum amount of clearance volume at the top of the stroke. When a cylinder is in the unloaded state, there is no force applied to the top of the piston from the compressed gas to hold the internal clearances at a minimum and keep the piston from tilting within the cylinder.

SUMMARY OF THE INVENTION

In accordance with one embodiment, a piston assembly is provided for use with a reciprocating compressor for maximizing the volumetric efficiency of the compressor. The piston assembly includes a piston located within a piston cylinder. The piston has a first end and a second end. A wrist pin is associated with the first end of the piston. A cylinder head/valve assembly is associated with the second end of the piston. At least a portion of the second end of the piston includes an angled portion. At least a portion of the angled portion of the second end of the piston and the cylinder head/valve assembly define a clearance volume and is configured to compensate for tilt of the piston after a top dead center of the piston is reached during a reciprocating cycle of the piston. The wrist pin can be configured to receive the first end of the piston so that the angled portion extends in a correct orientation with respect to the cylinder head/valve assembly. The wrist pin can include a connecting rod and a crankshaft. The angled portion includes a slope extending in a downward direction from a center portion of the piston toward an outer edge portion of the piston.

According to one embodiment, the second end of the piston can include two angled portions. Each of the angled portions can include a slope extending in a downward direction at opposite locations from each other from a center portion of the piston toward opposed outer edge portions of the piston.

According to one embodiment, the pistons can be configured for use with oil free cylinders and trunk type pistons.

In accordance with another embodiment of the invention, a multiple stage, multiple cylinder compressor is provided which includes a series of piston assemblies. Each of the piston assemblies include a piston located within a piston cylinder. The piston has a first end and a second end, a wrist pin associated with the first end of the piston, and a cylinder head/valve assembly associated with the second end of the piston. At least a portion of the second end of the piston includes an angled portion. At least a portion of the angled portion of the second end of the piston and the cylinder head/valve assembly define a clearance volume. This angled portion reduces the clearance volume between the second end of the piston and the cylinder head/valve. The angled portion is configured to compensate for tilt of the piston after a top dead center of the piston is reached during a reciprocating cycle of the piston.

The wrist pin can be configured to receive the first end of the piston so that the angled portion extends in a correct orientation with respect to the cylinder head/valve assembly. The angled portion can include a slope extending in a downward direction from a center portion of the piston toward an outer edge portion of the piston. According to one embodiment, the second end of the piston can include two angled portions and each of the angled portions can include a slope extending in a downward direction, at opposite locations from each other, and extending from a center portion of the piston toward opposed outer edge portions of the piston. According to one embodiment, the wrist pin can include a connecting rod and a crankshaft.

In accordance with another embodiment, a method of increasing the volumetric efficiency of a reciprocating compressor includes providing a piston assembly configured for use with the reciprocating compressor, the piston assembly including a piston located within a piston cylinder, wherein the piston has a first end and a second end; a wrist pin associated with the first end of the piston; and a cylinder head/valve assembly associated with the second end of the piston. The method further includes providing an angled portion on at least a portion of the second end of the piston which reduces the clearance volume between the second end of the piston and the cylinder head/valve assembly which compensates for tilt of the piston after a top dead center of the piston is reached during a reciprocating cycle of the piston. The angled portion can be provided with a slope extending in a downward direction from a center portion of the piston toward an outer edge portion of the piston. According to one embodiment, the method can include providing two opposed angled portions on the second end of the piston.

Further details and advantages will become apparent upon reviewing the detailed description set forth herein in connection with the accompanying drawings.

BRIEF DESCRIPTION OF THE DRAWINGS

FIG. 2 is a cross-sectional side view of the piston of FIG. 1 in a tilted position.

FIG. 2A is an exploded view of section 2A of FIG. 2 showing the increased clearance distance between the piston and cylinder head/valve caused by titling in accordance with the prior art.

FIG. 2B is an exploded view of section 2B of FIG. 2 showing the decreased clearance distance between the piston and cylinder head/valve caused by tilting.

FIG. 3 is a cross-sectional view of a known piston and cylinder in which additional clearance is provided between the piston and cylinder.

FIG. 3A is an exaggerated view of the piston and valve of FIG. 3 before titling of the piston.

FIG. 3B is an exaggerated view of the piston and valve of FIG. 3 after tilting of the piston.

FIG. 4 is a top view of a piston with an angled portion in accordance with the principles of this disclosure.

FIG. 5 shows a cross-sectional side view of a piston and cylinder wherein the piston includes an angled portion as shown in FIG. 4.

DESCRIPTION OF THE INVENTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Referring to FIGS. 1-5, a piston assembly, generally designated 10, is shown for use with a reciprocating compressor for maximizing the volumetric efficiency of the compressor. Normally, a pneumatic system is provided for a rail vehicle by which the brakes of the rail vehicle are operated. An air compressor is used to supply compressed air to one or more pneumatic units associated with the rail vehicle involved in the operation of the brakes. The air compressor usually consists of a driving unit, such as an electric motor, and of a compressor unit, which typically consists of several piston-cylinder assemblies 10 that are driven by a crankshaft.

Figure 1:
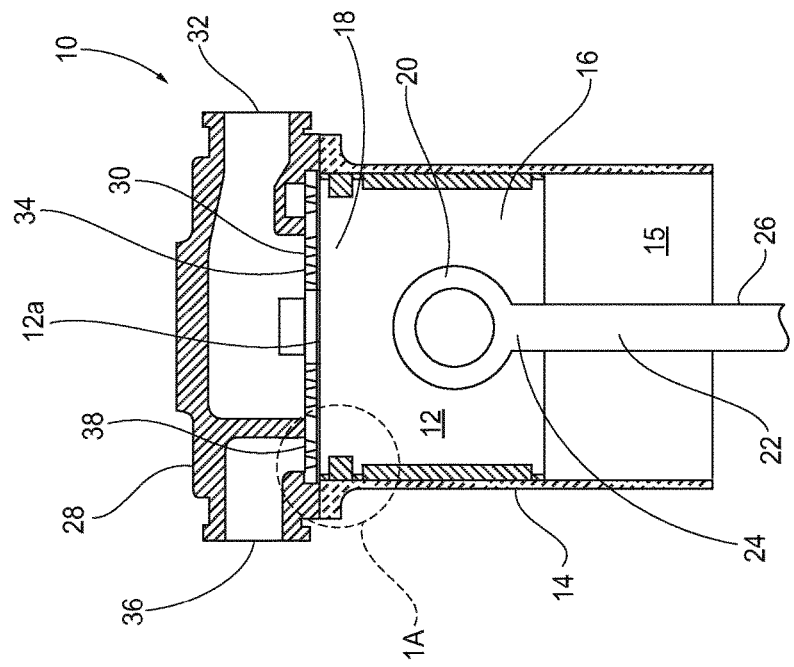
FIG. 1 is a cross-sectional side view of a piston in accordance with the prior art at the top dead center just prior to changing directions.

With continuing reference to FIGS. 1 and 2, the piston assembly 10 includes a piston 12, having one or more piston rings 13 located within a piston cylinder 14. The piston 12 has a first end 16 and a second end 18. A wrist pin 20 is associated with the first end 16 of the piston 12. The wrist pin 20 is connected to one end 24 of a connecting rod 22. The opposite end 26 of the connecting rod 22 is connected to a crankshaft (not shown) which directly drives the piston 12. The piston assembly 10 further includes a cylinder head 28 and valve 30 associated with the second end 18 of the piston 12. The cylinder head 28 includes a low side suction line 32 which cooperates with a suction valve 34 in the valve 30 and a high side discharge line 36, which cooperates with a discharge valve 38 in the valve 30, which cooperate together to give the compressor the ability to pump air against a pressure difference.

During a complete revolution of the crankshaft, as the crankshaft rotates, the piston 12 begins to move downward, reducing the pressure in the piston cylinder 14. This reduced pressure causes the suction valve 34 to open and allow air to flow from the low side suction line 32 and into the piston cylinder 14 until the piston cylinder 14 is filled with air and the piston 12 is at the bottom of its stroke or at bottom dead center. As the crankshaft continues to rotate and cause the piston 12 to begin its upward stroke, the suction valve 34 closes. As the piston 12 continues to move in an upward direction, the volume within the space of the piston cylinder 14 reduces, increasing the pressure of the air. This increased pressure causes the discharge valve 38 to open, letting the compressed air flow out of the piston cylinder 14 and through the high side discharge line 36 until the piston 12 reaches the top dead center position, as shown in FIG. 1.

As discussed above, the volumetric efficiency of a reciprocating compressor is defined by the ratio of the actual amount of air flow discharged from the compressor (actual air delivery volume) to the total amount of air that can theoretically flow into the compressor inlet during the intake stroke (swept volume). The actual amount of compressed air delivered from the compressor can be effected by the amount of volume between the top 12a of the piston 12 (the crown) and the cylinder valves 34, 38 when the piston 12 is at the top of its stoke or top dead center. This volume is called the clearance volume 40, as shown illustrated in FIGS. 1A and 1B. The clearance volume 40 defines the amount of air that is pulled into the cylinder on the intake stroke, compressed during the compression stroke, but is not discharged from the cylinder before the next intake stroke.

During operation of the piston assembly 10, the compressed air left behind in the clearance volume 40 re-expands filling the cylinder volume that otherwise would have been filled with atmospheric air being pulled into the piston cylinder 12. The end result of the re-expansion is that the piston assembly 10 is not capable of delivering, during the discharge stroke, the same amount of air that can be theoretically ingested into the piston assembly 10 during the intake stroke.

Figure 1A:
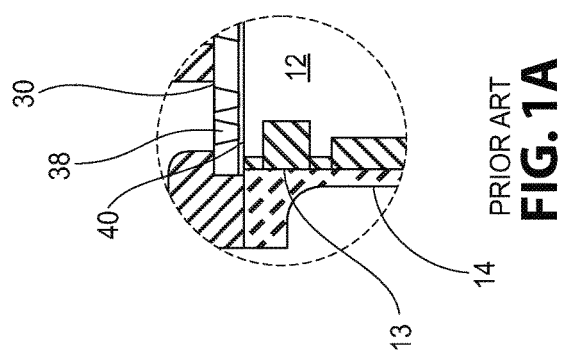
FIG. 1A is an exploded view of section 1A of FIG. 1 showing the clearance volume between the piston and cylinder head/valve.
Figure 1B:
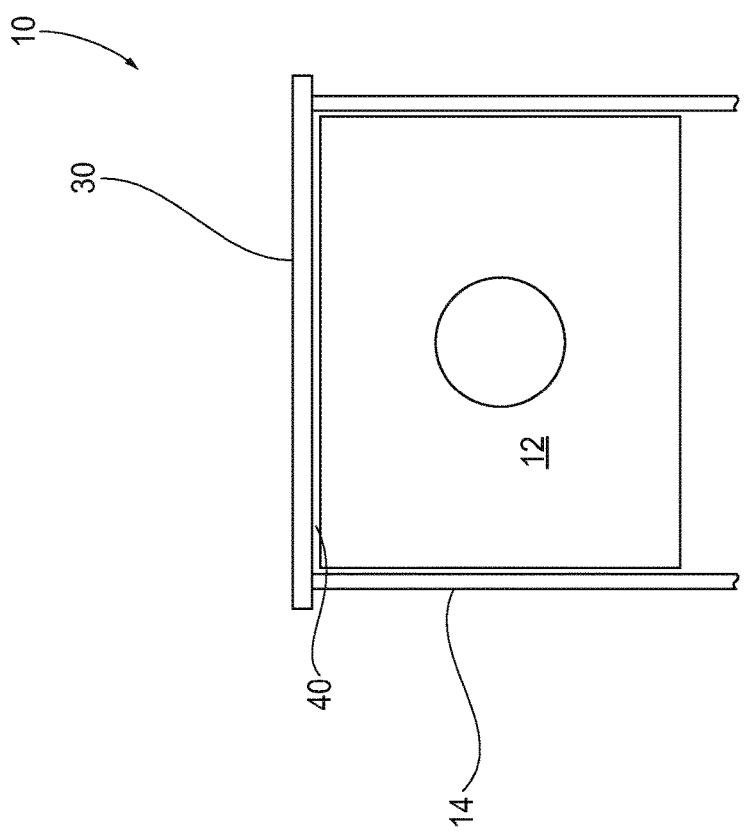
FIG. 1B is an exaggerated view of the piston and the bottom portion of the valve of FIG. 1 showing the clearance volume therebetween before tilting the piston.
Figure 2C:
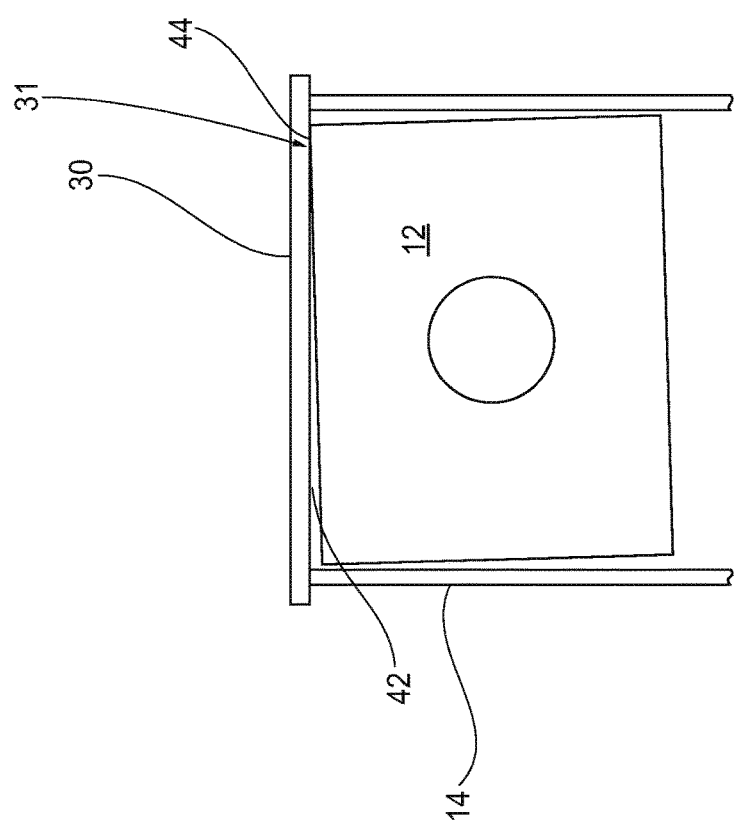
FIG. 2C is an exaggerated view of the piston and the bottom portion of the valve of FIG. 2 after tilting of the piston.

With continuing reference to FIG. 1, a piston 12 is shown at its top dead center just prior to changing directions. FIGS. 1A and 1B show the clearance volume 40 between the piston 12 and the valve 30. As illustrated in FIG. 2, when the piston 12 changes direction, especially during unloaded operation, the piston 12 tilts in the piston cylinder 14 about the wrist pin 20, which acts as a fulcrum. This tilt is illustrated in FIG. 2 showing the piston 12 at the moment just after the top dead center position. The piston tilt causes the distance between the top 12a of the piston 12 and the cylinder head 28 and valve 30 to increase on one side, as indicated at 42 in FIGS. 2A and 2C, and to decrease on the other side, as indicated at 44 in FIGS. 2B and 2C. If the clearance between the piston and cylinder head 28 and valve 30 is designed to be a minimum when the piston 12 is perpendicular in the bore 15 of the piston cylinder 14, then the clearance between the piston 12 and the cylinder head 28 and valve 30 may reduce to zero when the piston tilts as shown by 44 in FIG. 2B. If the clearance reduces to zero, contact between the piston 12 and the cylinder head 28 and valve 30, as indicated by 31 in FIG. 2C, will eventually, if not immediately, result in compressor failure.

To account for this piston tilt, a commonly used method is to add extra clearance as shown by 48 in FIGS. 3 and 3A between the piston 12 and the cylinder head 28 and valve 30 at the top dead center. As shown by 43 in FIG. 3B, after tilting, the extra clearance 48 between the piston 12 and valve 30 is sufficient to prevent any contact between the piston 12 and valve 30. While this extra clearance 48 is effective in eliminating the contact, this increased clearance results in increased clearance volume and therefore, reduced compressor efficiency.

Figures 5A, 5B:
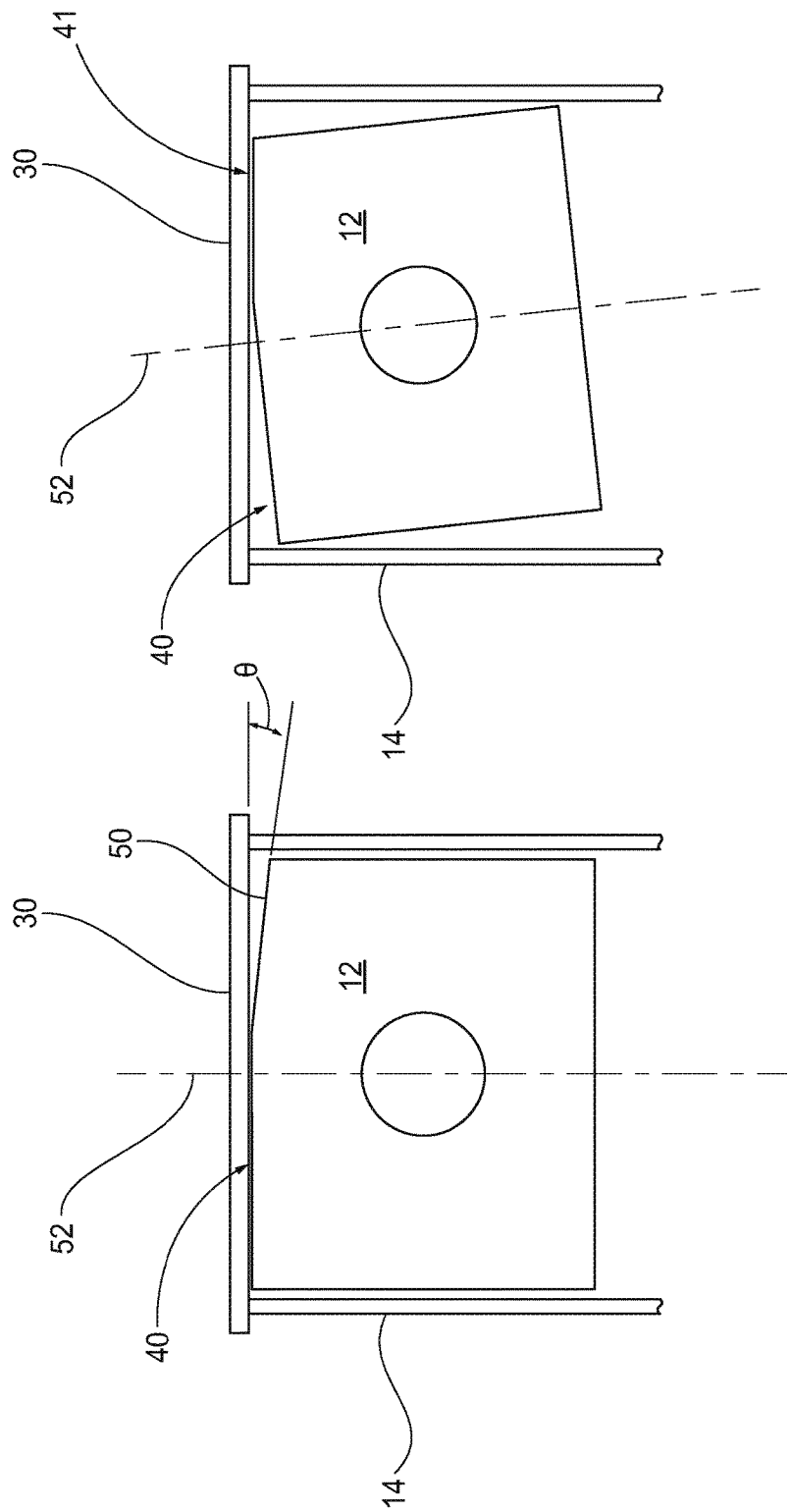
FIG. 5A is an exaggerated view of the piston and valve of FIG. 5 before titling of the piston.
FIG. 5B is an exaggerated view of the piston and valve of FIG. 5 after tilting of the piston.

The present disclosure accounts for piston tilt without increasing the clearance volume by providing at least a portion of the second end 18 of the piston 12 with an angled portion 50, as illustrated in FIGS. 4-5. This angled portion 50 of piston 12, shown as θ in FIGS. 5 and 5A, is sized so that when the piston 12 tilts at the top of the stroke during the change in piston direction within the piston cylinder 14, the additional clearance volume necessary for an oil free compressor does not need to be added across the entirety of the piston 12. As shown in FIGS. 5 and 5A, this angled portion 50 of the second end 18 of the piston 12 defines a clearance volume 40 that is sufficient to compensate for tilt of the piston 12 after a top dead center of the piston 12 is reached during a reciprocating cycle of the piston 12. The wrist pin 20 can be configured to receive the first end 16 of the piston 12 so that the angled portion 50 extends in a correct orientation with respect to the cylinder head 28 and valve assembly 30. As shown in FIGS. 4, 5, and 5A, the angled portion 50 includes a slope extending in a downward direction from the side of a center portion 52 of the piston 12 toward an outer edge portion 54 of the piston 12. According to one design, the center portion 52 is flat and the slope or angled portion 50, as depicted in FIGS. 5 and 5A, starts just to the right of the flat portion 52 and extends away from the top of the piston 12. As shown by 41 in FIG. 5B, after tilting, the angled portion 50 ensures that no contact occurs between the piston 12 and the valve 30.

According to one embodiment (not shown), the second end 18 of the piston 12 can include two angled portions 50. Each of the angled portions 50 can include a slope extending in a downward direction at opposite locations from each other from the flat center portion 52 of the piston 12 toward opposed outer edge portions 54 of the piston 12.

According to one embodiment, the piston 12 of the invention can be configured for use with oil free cylinders and trunk type pistons.

This same phenomenon of volumetric efficiency loss occurs within each stage of a multiple stage compressor. The difference is that the inlet air is at a higher pressure than ambient pressure if the piston assembly 10 is part of the second, third, or subsequent stage of a compressor. The clearance volumes 40 in each piston assembly 10 and stage are additive and result in a reduction in overall compressor efficiency. The role that the clearance volume 40 plays in determining the overall efficiency of an air compressor makes it a critical characteristic of compressor design. Simply stated, a compressor with less clearance volume 40 is more efficient than a compressor with more clearance volume.

A method of increasing the volumetric efficiency of a reciprocating compressor according to the present invention includes providing a piston assembly 10 configured for use with the reciprocating compressor, wherein the piston 12 located within the piston cylinder 14 includes an angled portion 50 on at least a portion of the second end 18 of the piston 12 which is located adjacent to the cylinder head 28 and valve 30 assembly. As discussed above, providing this angled portion 50 reduces the clearance volume between the second end 18 of the piston 12 and the cylinder head 28 and valve 30 assembly which compensates for tilt of the piston after a top dead center of the piston is reached during a reciprocating cycle of the piston. The angled portion 50 can be provided with a slope extending in a downward direction from a center portion 52 of the piston 12 toward an outer edge portion 54 of the piston 12. According to one embodiment (not shown), the method can include providing two opposed angled portions 50 on the second end 18 of the piston 12.

While embodiments of piston assembly for reducing clearance volume in a reciprocating compressor for compensating for piston tilt and improving the volumetric efficiency of the compressor is provided in the foregoing description, those skilled in the art may make modifications and alterations to these embodiments without departing from the scope and spirit of the invention. Accordingly, the foregoing description is intended to be illustrative rather than restrictive.

The invention claimed is:

1. A piston assembly for use with a reciprocating compressor comprising:
   a piston reciprocally operable within a piston cylinder, said piston having a first end and a second end, the second end comprising a center portion, an outer edge portion, and an angled portion;
   a wrist pin associated with the first end of the piston;
   a cylinder head/valve assembly associated with the piston cylinder, the second end of the piston defining a clearance volume with the cylinder head/valve assembly,
   wherein the angled portion is a slope extending in a downward direction from the center portion of the piston toward an outer edge portion of the piston to compensate for tilt of the piston after a top dead center of the piston is reached during a reciprocating cycle of the piston and additional clearance volume is minimized across the entirety of the second end of the piston, and
   wherein the center portion is flat and the angled portion begins at an end of the flat center portion and slopes toward the outer edge portion beginning approximately at a midpoint of the second end of the piston.

2. The piston assembly of claim 1, wherein the wrist pin is connected to the first end of the piston so that the angled portion extends in a spaced orientation relative to the cylinder head/valve assembly to accommodate the tilt of the piston.

3. The piston assembly of claim 1, wherein the second end of the piston comprises two angled portions.

4. The piston assembly of claim 3, wherein each of the angled portions comprises a slope extending in a downward direction, at opposite locations from each other, and extending from the center portion of the piston to the outer edge portion of the piston.

5. The piston assembly of claim 1, wherein the wrist pin is connected to one end of a connecting rod.

6. The piston assembly of claim 1, wherein the piston has one or more piston rings.

7. A multiple stage, multiple cylinder compressor including a series of piston assemblies, each of the piston assemblies comprising:
   a piston reciprocally operable within a piston cylinder, said piston having a first end and a second end, the second end comprising a center portion, an outer edge portion, and an angled portion;
   a wrist pin associated with the first end of the piston cylinder; and
   a cylinder head/valve assembly associated with the piston cylinder, the second end of the piston defining a clearance volume with the cylinder head/valve assembly, and wherein the angled portion is a slope extending in a downward direction from the center portion of the piston toward an outer edge portion of the piston to compensate for tilt of the piston after a top dead center of the piston is reached during a reciprocating cycle of the piston and additional clearance volume is minimized across the entirety of the second end of the piston, and wherein the center portion is flat and the angled portion begins at an end of the flat center portion and slopes toward the outer edge portion beginning approximately at a midpoint of the second end of the piston.

8. The multiple stage, multiple cylinder compressor of claim 7, wherein the wrist pin is connected to the first end of the piston so that the angled portion extends in a correct orientation with respect to the cylinder head/valve assembly.

9. The multiple stage, multiple cylinder compressor of claim 7, wherein the second end of the piston comprises two angled portions.

10. The multiple stage, multiple cylinder compressor of claim 9, wherein each of the angled portions comprises a slope extending in a downward direction, at opposite locations from each other, and extending from the center portion of the piston to the outer edge portion of the piston.

11. The multiple stage, multiple cylinder compressor of claim 7, wherein the wrist pin is connected to one end of a connecting rod.

12. A method of increasing the volumetric efficiency of a reciprocating compressor comprising:
   providing a piston assembly configured for use with the reciprocating compressor, said piston assembly comprising:
      a piston reciprocally operable within a piston cylinder, said piston having a first end and a second end;
      a wrist pin associated with the first end of the piston cylinder; and
      a cylinder head/valve assembly associated with the piston cylinder, the second end of the piston defining a clearance volume with the cylinder head/valve assembly; and
   providing an angled portion on the second end of the piston, the second end comprising a center portion, an outer edge portion, and the angled portion comprising a slope extending in a downward direction from the center portion to the outer edge portion compensating for tilt of the piston after a top dead center of the piston is reached during a reciprocating cycle of the piston and additional clearance volume is minimized across the entirety of the second end of the piston, and
   wherein the center portion is flat and the angled portion begins at an end of the flat center portion and slopes toward the outer edge portion beginning approximately at a midpoint of the second end of the piston.

13. The piston assembly of claim 1, wherein the cylinder head/valve assembly further comprises a cylinder head and a valve.

14. The piston assembly of claim 13, wherein the cylinder head comprises a low side suction line which cooperates with a suction valve in the valve and a high side discharge line which cooperates with a discharge valve in the valve.

15. The multiple stage, multiple cylinder compressor of claim 7, wherein the wrist pin is connected to the first end of the piston so that the angled portion extends in a spaced orientation relative to the cylinder head/valve assembly to accommodate the tilt of the piston.

16. The multiple stage, multiple cylinder compressor of claim 7, wherein the cylinder head/valve assembly piston assembly further comprises a cylinder head and a valve.

17. The multiple stage, multiple cylinder compressor of claim 16, wherein the cylinder head comprises a low side suction line which cooperates with a suction valve in the valve and a high side discharge line which cooperates with a discharge valve in the valve.

* * * * *